Patented Apr. 23, 1929.

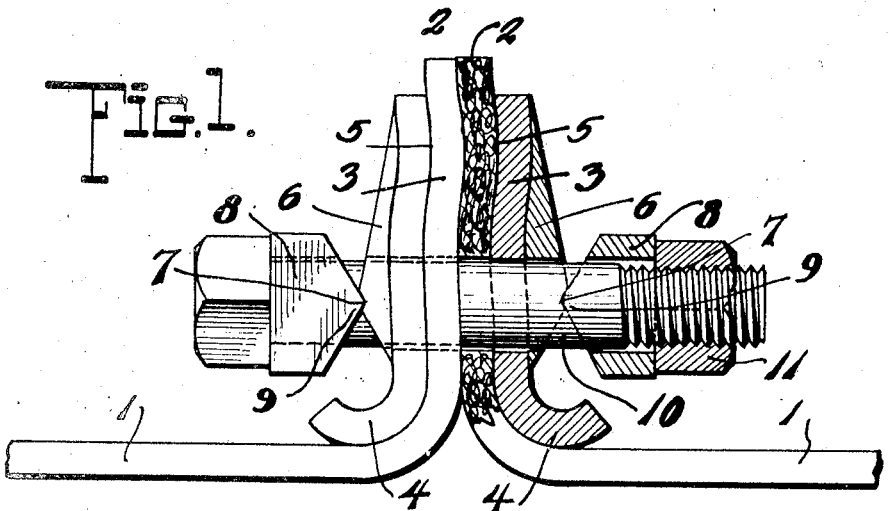

1,710,297

UNITED STATES PATENT OFFICE.

HUBERT D. COLLINS, OF TULSA, OKLAHOMA, ASSIGNOR TO GYPSY OIL COMPANY, OF TULSA, OKLAHOMA.

BELT CLAMP.

Application filed July 12, 1928. Serial No. 292,262.

This invention relates to improvements in devices for joining the ends of belting so as to make a highly efficient continuous running joint, thereby enabling the belting to be used for operating over pulleys.

There are numerous types of belt clamps for joining the ends of belting, one of the most common types being used for those belts where the ends that are to be joined are at right angles to the rest of the belt. Considerable trouble has been had when these types of belt clamps have been put into actual use, due to the failure of the bolts which draw the two sections of the clamps together. It has been found that the pull on the two sections of the belt at the joint, when the belt was subjected to a pulsating load, caused a bending of the bolts, the bending action being in the nature of a fatigue of the bolts, causing breakage in a comparatively short time.

It is an object of this invention to localize or concentrate the belt load of the clamp bolts along the neutral axis of the bolts, thus preventing their failure by fatigue.

Other and further objects and advantages of the invention will be hereinafter set forth and the novel features thereof defined by the appended claims.

In the drawing:

Fig. 1 is a side elevation of my improved belt clamp, parts being broken away and shown in section;

Fig. 2 is a fragmentary top plan view of the preferred form of my invention;

Fig. 3 is a fragmentary front elevation of the preferred form of my invention, the belt being shown in section;

Fig. 4 is a fragmentary top plan view of a modified form of my invention; and

Fig. 5 is a fragmentary front elevation of the modified form of my invention, the belt being shown in section.

Like numerals refer to like parts in the several figures of the drawing in which 1 designates the belt having outwardly turned ends 2 which are clamped between plates 3. The ends of the plates at the place where the ends of the belt enter the clamp are curved laterally at 4 to prevent chafing or cutting of the belt during its movement over the pulleys. Said plates 3 are also curved at 5 in the usual manner to increase the friction against the ends of the belt and to present a greater bearing surface against said ends of the belt. Adjacent the plates 3 are supplemental clamping plates or bearing members 6 of substantially triangular cross section, having longitudinal grooves 7 which are engaged by clamping members 8 of a substantially wedge shaped formation, as indicated at 9. Said clamping members 8 and plates 3 and 6, as well as the outwardly turned ends of the belt 2, are apertured to receive clamping bolts 10 provided with the usual clamping nuts 11.

It is to be understood that it is within the scope of this invention to modify the engaging faces of the plates 6 and clamping members 8 so as to provide the clamping members 8 with the grooves 7 and form the wedge engaging portions on the plates 6, this being merely a reversal of parts as shown in the several figures of the drawing, also, if it is so desired, plates 3 and 6 may be formed integrally.

In the preferred form of my invention the members 8 are in the form of bars extending transversely of the belt, as shown in Figs. 2 and 3. However, instead of bars, they may be in the form of washers 12, as shown in the modified form, Figs. 4 and 5.

Upon putting my improved clamp into use the stresses tending to bend the bolts 10 are relieved by the rocking of the knife edges of the members 8 in the grooves 7 of the plates 6, said knife edges and grooves being located in a plane parallel to the operative face of the belt and passing through the neutral axis of the bolts. Thus the associated clamping members and plates automatically adjust themselves with respect to the bolts without producing bending stresses in said bolts and at the same time the maximum clamping action is obtained.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a belt clamping device, a connecting member, and clamping means for engaging the belt and comprising coacting parts, one of said parts having a knife edge bearing contact for concentrating the stresses produced by the said connecting member.

2. In a belt clamping device, a pair of complemental clamping plates provided with grooved bearing surfaces, supplemental clamping members provided with projecting edges adapted to engage said grooves, and bolts for holding the members in cooperative clamping relation.

3. In a belt clamping device, a pair of complemental clamping plates provided with grooved clamping surfaces arranged parallel to the operative face of the belt, supplemental clamping members provided with projecting edges adapted to engage said grooves, and bolts for holding the members in cooperative clamping relation.

4. In a belt clamping device, a pair of complemental clamping plates, supplemental plates, said supplemental plates being grooved, clamping members of substantially wedge-shaped formation adapted to engage said grooves, and clamping bolts passing through said plates and clamping members for compressing the same.

5. In a belt clamping device, bearing members adapted to receive the ends of the belt therebetween and having a groove extending longitudinally of the said bearing members, compression means extending through the said belt and bearing members, and means cooperative with said compression means and engageable in said groove for concentrating the stresses in a plane.

In testimony whereof I affix my signature.

HUBERT D. COLLINS.